United States Patent
Brown

(10) Patent No.: US 8,120,222 B2
(45) Date of Patent: Feb. 21, 2012

(54) ROTATING ELECTRICAL MACHINE

(75) Inventor: Neil Brown, Holbeach (GB)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 137 days.

(21) Appl. No.: 12/501,937

(22) Filed: Jul. 13, 2009

(65) Prior Publication Data

US 2010/0013340 A1    Jan. 21, 2010

(30) Foreign Application Priority Data

Jul. 16, 2008   (GB) .................................. 0813033.8
Mar. 10, 2009   (GB) .................................. 0904127.8

(51) Int. Cl.
*H02K 19/12*   (2006.01)

(52) U.S. Cl. .............. 310/156.36; 310/156.48; 310/269; 310/165

(58) Field of Classification Search ............. 310/156.36, 310/156.48, 156.49, 156.54, 156.25, 165, 310/269
See application file for complete search history.

(56) References Cited

U.S. PATENT DOCUMENTS

| | | | | |
|---|---|---|---|---|
| 3,411,027 A | * | 11/1968 | Rosenberg | 310/181 |
| 5,682,073 A | * | 10/1997 | Mizuno | 310/165 |
| 6,396,181 B1 | * | 5/2002 | Akemakou | 310/156.01 |
| 7,064,466 B2 | * | 6/2006 | Kusase | 310/156.66 |
| 2003/0227231 A1 | | 12/2003 | Ostovic | |
| 2004/0189132 A1 | | 9/2004 | Horst | |
| 2004/0232794 A1 | | 11/2004 | Hsu | |
| 2005/0258699 A1 | | 11/2005 | Hsu | |
| 2007/0176505 A1 | | 8/2007 | Trzynadlowski et al. | |

FOREIGN PATENT DOCUMENTS

| | | |
|---|---|---|
| EP | 0 228 873 A1 | 7/1987 |
| EP | 0 261 953 A2 | 3/1988 |
| EP | 0 631 373 A2 | 12/1994 |
| GB | 990699 | 4/1965 |
| GB | 2 383 692 A | 7/2003 |
| WO | WO 2004/095679 A1 | 11/2004 |

OTHER PUBLICATIONS

British Search Report of Application No. GB0813033.8, dated Mar. 10, 2009.
British Search Report of Application No. GB0904127.8, dated Jul. 2, 2009.

* cited by examiner

*Primary Examiner* — Dang Le
(74) *Attorney, Agent, or Firm* — Hamre, Schumann, Mueller & Larson, P.C.

(57) ABSTRACT

A rotating electrical machine includes a stator and a rotor arranged to rotate inside the stator. The rotor includes a plurality of permanent magnets arranged to produce a radial magnetic flux in an airgap between the rotor and the stator. The machine also includes a stationary excitation coil. The rotor also includes a plurality of low reluctance elements. A current through the stationary excitation coil causes a magnetic flux to be established in a magnetic flux path which passes into the rotor through a first low reluctance element and out of the rotor through a second low reluctance element, which magnetic flux combines with the radial magnetic flux produced by the permanent magnets in the airgap. This arrangement can allow control of the field within a permanent magnet radial flux machine.

41 Claims, 10 Drawing Sheets

ROTATING ELECTRICAL MACHINE

BACKGROUND TO THE INVENTION

The present invention relates to rotating electrical machines, and in particular to rotating electrical machines having permanent magnets.

Rotating electrical machines, such as motors and generators, generally comprise a rotor and a stator, which are arranged such that a magnetic flux is developed between the two. In a permanent magnet (PM) type machine, a number of permanent magnets are usually mounted on the rotor, while the stator is provided with stator windings. The permanent magnets cause a magnetic flux to flow across the air gap between the rotor and the stator. In the case of a generator, when the rotor is rotated by a prime mover, the rotating magnetic field causes an electrical current to flow in the stator windings, thereby generating the output power. In the case of a motor, an electrical current is supplied to the stator windings and the thus generated magnetic field causes the rotor to rotate.

Permanent magnet type machines have many advantages, including high power density, high efficiency, compact size and ease of manufacture. A significant disadvantage is the lack of field control within the machine. This can create problems when operating the machine as a generator or motor. When PM machines are operated as generators the output voltage varies with load current and cannot be kept constant. This poor voltage regulation is unacceptable for some load types, limiting the application of PM machines. When PM machines are operated as a motor the emf (electromotive force) generated within the motor increases with speed. The supply voltage to the motor is required to be greater than this internally generated emf, increasing converter costs. A popular strategy for minimising converter costs is to reduce the internally generated emf by suppressing the field within the machine by orientating the armature field produced by the armature current. This is known as 'field weakening' control but suffers reduced efficiency as the demagnetising current is supplied from the armature. Furthermore for applications that require both a combination of motor/generator operation such as hybrid vehicles the ability to control the field is increasingly important. For example overload conditions can be accommodated by increasing the field within the machine rather than increasing armature current thus minimising converter costs. In addition system efficiency improvements may be made as the flexibility of field control can minimise losses within the machine and converter for different operating speeds and torques.

WO 03/003546, the contents of which are incorporated herein by reference, discloses an axial flux machine with a rotor and an annular stator. The rotor has two discs mounted on a common rotor shaft, one on either side of the stator which carries field windings. Each rotor disc has two permanent magnets diametrically opposite one another on its face adjacent the stator and two pole pieces of non-magnetised ferromagnetic material diametrically opposite one another on the same face of the rotor disc. A control winding is carried by the stator in its central aperture. The control winding can be energized to establish a control field which establishes a closed loop of magnetic flux through each juxtaposed magnet and non-magnetised pole piece and thereby opposes armature reaction.

BRIEF DESCRIPTION OF THE INVENTION

According to a first aspect of the present invention there is provided a rotating electrical machine comprising a stator, a rotor arranged to rotate inside the stator, the rotor comprising a plurality of permanent magnets arranged to produce a radial magnetic flux in an airgap between the rotor and the stator, and a stationary excitation coil. The rotor comprises a plurality of low reluctance elements, and a current through the stationary excitation coil causes a magnetic flux to be established in a magnetic flux path which passes into the rotor through a first low reluctance element and out of the rotor through a second low reluctance element, which magnetic flux combines with the radial magnetic flux produced by the permanent magnets in the airgap.

In the machine disclosed in WO 03/003546, the flux of the control field passes through the axle. If a large control field were required, this would necessitate an axle of large cross-sectional area. However this is undesirable, because it would reduce the surface area of the rotor and stator facing the air gap, and thus the amount of magnetic flux across the air gap. The machine disclosed in WO 03/003546 is also limited in terms of its maximum size. Furthermore, the stator must be wound using non-conventional techniques, which may increase the manufacturing cost.

The present invention may allow the amount of radial magnetic flux between the rotor and the stator to be altered in dependence on the current through the stationary excitation coil. This can allow the amount of magnetic flux between the rotor and the stator to be controlled in a radial flux machine. This can allow control of the field within the machine, while preserving the advantages of a permanent magnet machine.

The radial flux machine of the present invention may also have the advantage that a conventional winding process may be employed to wind the stator, which may simplify manufacture. The machine may also be scalable axially and/or radially, so that a machine with a wide range of ratings can be made. Furthermore, the design of machine may allow a larger radial magnetic flux to be produced by increasing the cross-sectional area of the rotor. Increasing the maximum magnetic flux through the ferrous poles may allow control of the field across a wide range.

The low reluctance elements may comprise a material of high permeability (low reluctance). For example, the material may have a higher permeability (lower reluctance) than that of the permanent magnets. This can allow the low reluctance elements to provide a path of low reluctance through the rotor, thereby concentrating the magnetic flux in the magnetic flux path. Preferably the relative permeability of the material is at least 20, 30, 50, 100, 200 or 300. For example, the relative permeability may be around 500 or more.

Preferably the material is a ferromagnetic or ferrimagnetic material. A suitable material may be, for example, steel or iron, although other materials such as nickel, cobalt and manganese, or their compounds, could be used instead. Preferably the material is substantially non-magnetised when no current is passing through the excitation coil.

In one embodiment of the invention the low reluctance elements comprise a composite material formed from a powder of ferromagnetic metal, such as iron, embedded in resin. Such a composite material may have a high permeability, but low eddy current losses. In another embodiment, the material is a ferrite, which may be formed, for example, by sintering a powdered oxide of iron.

The low reluctance elements may be provided within the body of the rotor, or on its surface, or both.

The low reluctance elements may be located at different locations about (e.g. on or in) the rotor. In this case two elements may be magnetised in the opposite direction when a current is passed through the excitation coil, which may facilitate the establishment of a closed flux path through the rotor.

The magnetic flux path may pass through the rotor core. For example, the magnetic flux path may pass at least partially in an axial direction through the rotor core. This may facilitate the establishment of a closed flux path through the rotor.

The magnetic flux path may be at least partially co-located in a radial direction with the magnetic flux produced by the permanent magnets. Preferably the stator comprises stator windings through which the magnetic flux produced by the permanent magnets passes, and the magnetic flux produced by the stationary excitation coil passes through the same stator windings. This can avoid the need for a separate part of the machine to be provided for field control.

The rotating electrical machine may further comprise a plurality of ferrous poles through which at least part of the magnetic flux is established. For example, the ferrous poles may be formed from parts of the rotor itself, or from another material.

In one embodiment of the invention the low reluctance elements are rods embedded in the rotor. The rods may be located, for example, in passages running axially through the rotor. This may provide a convenient way of altering the magnetic flux in the rotor.

In this embodiment of the invention, each rod may be connected to a rotating magnetic ring. The rotating magnetic ring may be located, for example, at one end of the rotor in an axial direction. The stationary excitation coil may be arranged to generate a magnetic flux through the rotating magnetic ring. For example, the stationary excitation coil may be in the form of a stationary ring, and may be located adjacent or in proximity to the rotating magnetic ring. This may help to provide a brushless technique for establishing a flux path through the rotor.

In order to facilitate the establishment of the magnetic flux path, the machine may further comprise a stationary magnetic keep adjacent to the rotating magnetic ring. The stationary magnetic keep is preferably in the form of a stationary ring adjacent to the rotating magnetic ring. The stationary excitation coil may be located adjacent to or at least partially within the stationary magnetic keep. Thus, the stationary magnetic keep may be arranged to be magnetised by the stationary excitation coil, thereby to generate the magnetic flux through the rotating magnetic ring. This may facilitate a brushless technique for establishing a flux path through the rotor in response to the magnetic field generated by passing a current through the stationary excitation coil.

Preferably at least one rod provides a flux path into the rotor and at least one rod provides a flux path out of the rotor when a current is passed through the stationary excitation coil. For example, at least one rod may be connected to a first rotating magnetic ring and at least one other rod may be connected to a second rotating magnetic ring. Preferably the stationary excitation coil and/or stationary magnetic keep is located between the first rotating magnetic ring and the second rotating magnetic ring. This arrangement may facilitate the establishment of a closed flux path through the rotor in response to a current through the stationary excitation coil.

The permanent magnets may be fully or partially embedded in the rotor. In this case the permanent magnets may be orientated such that their north-south axes lie in a circumferential direction within the rotor. Each alternate magnet may face in the opposite direction. Parts of the rotor between the permanent magnets may form ferrous poles.

Alternatively, the permanent magnets may be disposed circumferentially about the rotor. For example, the permanent magnets may be arranged in a circular array of substantially constant pitch around the circumference of the rotor.

In another embodiment of the invention the low reluctance elements are ferrous poles. In this embodiment the ferrous poles may be located on the rotor, and a current through the excitation coil may cause a radial magnetic flux between the rotor and the stator to be produced through the ferrous poles.

By establishing a radial magnetic flux through the ferrous poles, the ferrous poles can act as additional magnets. This can allow the amount of magnetic flux across the air gap between the rotor and stator to be controlled, by adjusting the amount of current through the excitation winding. The present embodiment can therefore allow control of the field within the machine, while preserving the advantages of a permanent magnet machine.

Preferably the ferrous poles form a path of least reluctance through the rotor. This may help to ensure that the magnetic flux is established through the ferrous poles, rather than elsewhere in the rotor. Thus the ferrous poles are preferably of a lower reluctance than the permanent magnets.

The ferrous poles preferably comprise a material of high permeability, such as a ferromagnetic material. For example, the ferrous poles may be made from a high permeability metal, such as soft iron, or a high permeability alloy, such as a Cobalt based alloy. This can allow a strong magnetic flux to be established in response to the current through the excitation coil, which can facilitate control of the magnetic flux.

Preferably the ferrous poles are substantially non-magnetised, or have a low magnetisation, when no current is passing through the excitation coil. However hysteresis may cause the ferrous poles to have some residual magnetisation.

Preferably the permanent magnets are arranged in a circular array of substantially constant pitch around the circumference of the rotor. The permanent magnets may be located on the outside of the rotor, or may be embedded or partially embedded in the rotor. The poles of the magnets are preferably outward facing, and preferably alternate north and south.

The ferrous poles may be located adjacent to at least some of the permanent magnets. For example, alternate permanent magnets may have a ferrous pole located next to them. Some of the permanent magnets may be smaller than the other permanent magnets, and the ferrous poles may be located adjacent to the smaller permanent magnets. A smaller permanent magnet and a ferrous pole in combination may then have substantially the same size as a full size permanent magnet. Thus, in the case of the smaller permanent magnets, the ferrous poles may replace the part of the permanent magnet which would have been there had the permanent magnet been full size. Such an arrangement may facilitate control of the amount of magnetism without requiring significant structural changes to the machine, since a ferrous pole may simply replace a part of a permanent magnet which would otherwise have been there.

The rotor may comprise a first rotor section having a plurality of permanent magnets and a plurality of ferrous poles, and a second rotor section spaced axially from the first rotor section, the second rotor section having a plurality of permanent magnets and a plurality of ferrous poles. Preferably the magnetic flux path passes through a ferrous pole in both rotor sections.

According to another aspect of the invention there is provided a rotating electrical machine comprising a stator, a rotor arranged to rotate inside the stator, the rotor comprising a plurality of permanent magnets arranged to produce a radial magnetic flux in an airgap between the rotor and the stator, and a stationary excitation coil. The rotor comprises a first rotor section having a plurality of permanent magnets and a plurality of ferrous poles, and a second rotor section spaced axially from the first rotor section, the second rotor section having a plurality of permanent magnets and a plurality of ferrous poles. A current through the stationary excitation coil causes a magnetic flux to be established in a magnetic flux path which passes through a ferrous pole in both rotor sections.

The ferrous poles may be juxtaposed by one pole pitch between the first and second rotor sections. The magnetic flux produced by the excitation coil may pass through ferrous poles on the first and second rotor sections, for example, ferrous poles which are juxtaposed by one pole pitch. Such arrangements may facilitate the establishment of a closed flux path through the rotor, which may therefore facilitate control of the magnetism in a radial field machine.

Where the rotor comprises first and second rotor sections, the rotor may further comprise a rotating magnetic bridge linking the first rotor section and the second rotor section. The rotating magnetic bridge may provide a path for the flux between the first and second rotor sections. For example, the magnetic flux produced by the excitation coil may pass at least partially in an axial direction through the rotating magnetic bridge. Thus the rotating magnetic bridge may facilitate the establishment of a closed flux path through the rotor.

Preferably the ferrous poles are arranged on the central sides of the rotor sections, in an axial direction. For example, where the rotor comprises a rotating magnetic bridge, the ferrous poles may be arranged on the sides of the rotor sections closer to the rotating magnetic bridge. This may allow an excitation coil to magnetise the ferrous poles on both rotor sections, and may help with the establishment of a closed flux path through the rotor.

The excitation coil is preferably located adjacent to the ferrous poles. This may help with the establishment of a magnetic flux path through the ferrous poles. For example, the excitation coil may be located at least partially in a recess in the rotor. For example, where the rotor comprises a rotating magnetic bridge, the rotating magnetic bridge may have a smaller cross-sectional area than the first and second rotor sections. Thus, the recess in the rotor may be formed by a rotating magnetic bridge with a smaller cross-sectional area than first and second rotor sections. Alternatively or in addition, the excitation coil may be located at least partially within a recess in the stator. By locating the excitation coil in a recess in the rotor and/or stator, the excitation coil may be located close to the ferrous poles, without the need to increase the air gap between the rotor and stator.

The stator may comprise a first stator section, a second stator section, and a stator magnetic bridge between the first stator section and the second stator section. The stator magnetic bridge may then provide part of the flux path for the magnetic flux produced by the excitation coil. The magnetic flux produced by the excitation coil may pass circumferentially and/or axially through the stator magnetic bridge. For example, the flux may pass circumferentially through the stator magnetic bridge through one pole pitch, and axially from one side of the stator magnetic bridge to the other. This may provide a convenient way to close the flux path.

The first and second stator sections may comprise teeth which form slots for stator windings. The teeth may help to transfer magnetic flux across the air gap between the rotor and stator. However, the stator magnetic bridge may have no teeth, or teeth of a reduced size. This may help to encourage the flux path through the stator magnetic bridge. If necessary, a non-magnetic support material may be used to support the stator windings in the stator magnetic bridge. Alternatively teeth of a reduced size may be used to provide limited support for the windings.

Furthermore, by at least partially removing the teeth from the stator magnetic bridge, a recess may be created within which the excitation coil may be at least partially located. Thus, the stator magnetic bridge may be recessed with respect to the first and second stator sections, and the excitation coil may be at least partially located in the recess.

Preferably the stator comprises stator windings arranged circumferentially around the rotor. This can allow the machine to operate as a motor, by passing a commutated current through the stator windings, or as a generator, by generating a voltage in the stator windings, or alternately as one and the other.

The rotating electrical machine may further comprise control means for controlling the amount of current through the excitation coil. For example, where the rotating electrical machine is to be used at least some of the time as a generator, the machine may further comprise an automatic voltage regulator (AVR) in order to regulate the voltage at the output of the machine. Where the rotating electrical machine is to be used at least some of the time as a motor, the machine may further comprise a motor control circuit.

The excitation coil may comprise at least one winding, or preferably a plurality of windings, arranged circumferentially around the rotor. Alternatively, the excitation coil may comprise a plurality of wound cores arranged around the rotor.

Preferably the stator comprises a generally tubular chamber within which the rotor is arranged to rotate. Preferably the rotor is of a generally cylindrical shape.

According to another aspect of the invention there is provided a method of controlling the magnetic field of a radial flux permanent magnet rotating electrical machine, the machine comprising a stator and a rotor arranged to rotate inside the stator, the rotor comprising a plurality of permanent magnets which produce a magnetic flux in an airgap between the rotor and the stator, the method comprising passing a current through a stationary excitation coil, thereby establishing a magnetic flux in a magnetic flux path which passes into the rotor through a first low reluctance element and out of the rotor through a second low reluctance element, which magnetic flux combines with the radial magnetic flux produced by the permanent magnets in the airgap.

The method may further comprise controlling the amount of current through the stationary excitation coil, thereby controlling the amount of radial magnetic flux between the rotor and the stator.

Features of one aspect may be applied to another other aspect. Any of the apparatus features may be provided as method features and vice versa.

BRIEF DESCRIPTION OF THE DRAWINGS

Preferred features of the present invention will now be described, purely by way of example, with reference to the accompanying drawings, in which.

DESCRIPTION OF EMBODIMENTS OF THE INVENTION

Figure 1:
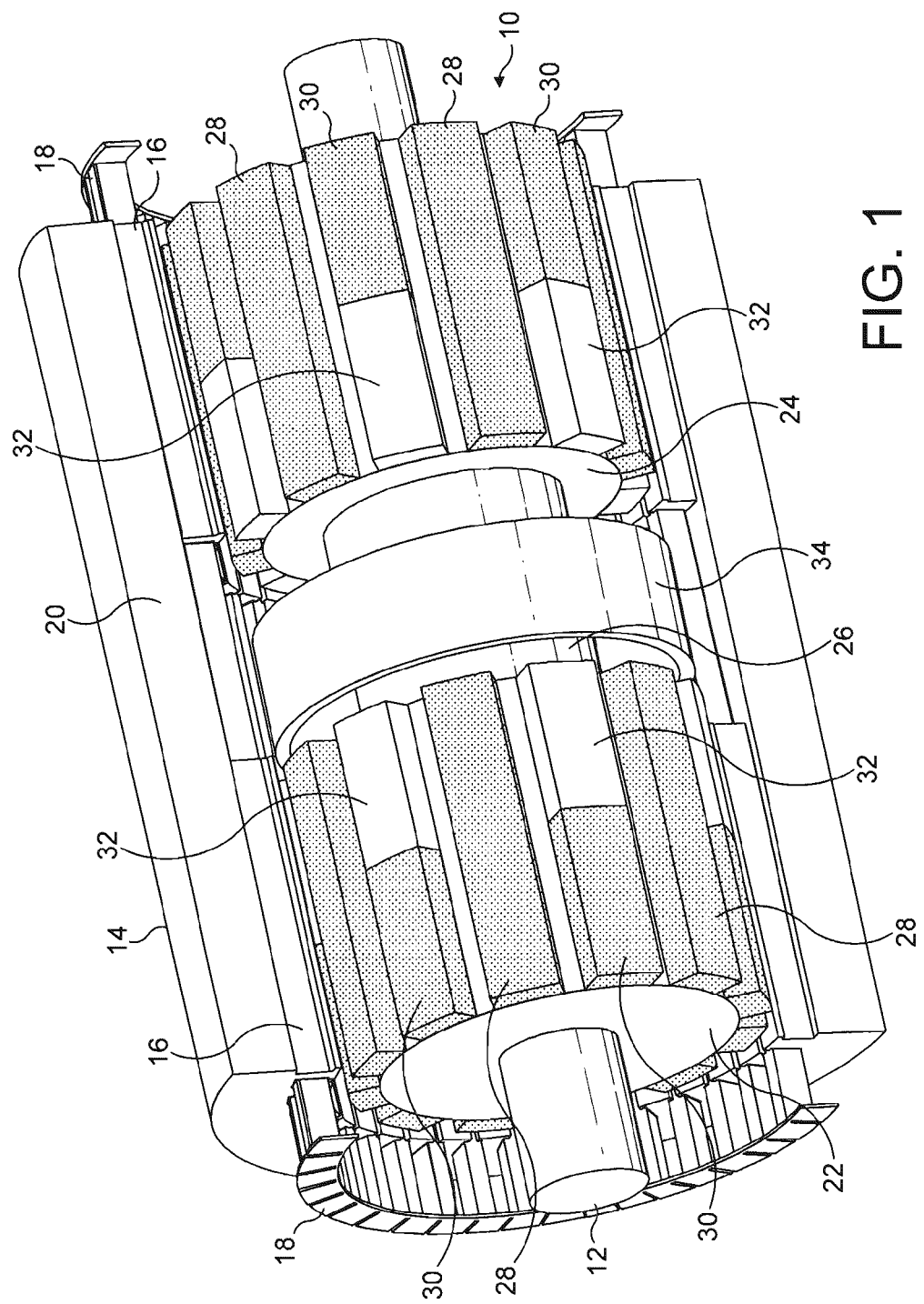
FIG. 1 shows parts of a rotating electrical machine in a first embodiment of the invention.

FIG. 1 shows parts of a rotating electrical machine in a first embodiment of the invention. Referring to FIG. 1, the machine comprises a rotor assembly 10 mounted on a shaft 12, and located within a stator 14. In this embodiment the stator is cylindrical, and has a tubular chamber within which the rotor assembly rotates.

The stator 14 is formed from a plurality of laminated sheets of metal stacked together from left to right in FIG. 1. The majority of the laminations are provided with slotted teeth 16 which hold the stator windings 18. The exceptions are the laminations in a magnetic bridge 20 shown in the centre of the machine. These laminations are similar to the laminations elsewhere in the stator, but without the slot/teeth profiles of the other laminations. Once the laminated stator is formed the windings 18 are inserted, insulated and impregnated using conventional methods.

The rotor assembly 10 consists of a first rotor section 22, a second rotor section 24, and a rotating magnetic bridge 26 linking the first and second rotor sections. The three sections are similar in that they are ferrous and may be cast or laminated.

The first rotor section 22 and the second rotor section 24 are both provided with permanent magnets 28, 30 at spaced locations around their circumferences. These permanent magnets have outwardly-facing poles which alternate north and south around the circumference of the rotor. Some of the permanent magnets 28 run substantially the whole axial length of the corresponding rotor section. However, in the present embodiment, some of the permanent magnets 30 are shorter. In the case of the shorter permanent magnets 30, ferrous poles 32 are provided adjacent the permanent magnets, so that a shorter permanent magnet 30 and a ferrous pole 32 in combination are substantially the same length as a full size permanent magnet 28. The ferrous poles 32 are of a material of high permeability, such as soft iron, and are non-magnetised. The ferrous poles are juxtaposed by one pole pitch between the first and second rotor sections.

The rotating magnetic bridge 26 is surrounded by an excitation coil 34 that is stationary but inset within the rotor assembly.

In operation, the rotor assembly 10 rotates about the shaft 12, within the stator 14. If the machine is operating as a generator, rotation of the rotor by a prime mover generates an output voltage in the stator windings. If the machine is operating as a motor, a converter is used to provide an electronically commutated DC current to the stator windings, and the switched DC current causes the rotor to rotate. Alternatively an AC current may be provided to the stator windings for synchronous operation.

Figure 2:
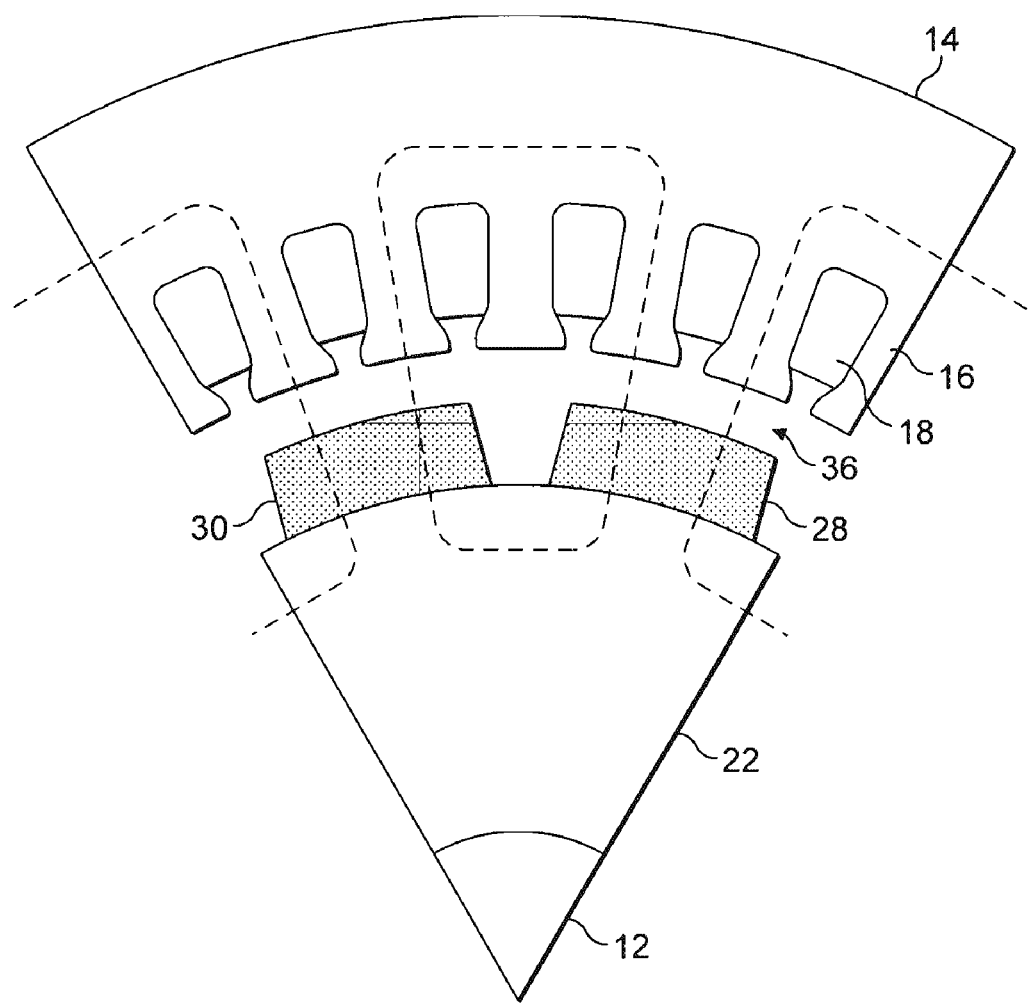
FIG. 2 shows a section of the machine of FIG. 1, cut circumferentially through the machine.

FIG. 2 shows a section of the machine cut circumferentially through the machine and viewed along the shaft axis of the machine. Here adjacent magnets tend to share flux circumferentially as shown by the dashed line. However, subject to the geometry of the path through the shaft, magnet, air gap and stator, and the percentage of ferrous pole to magnet poles, some of the flux will take a path through the centre of the rotor.

Figure 3:
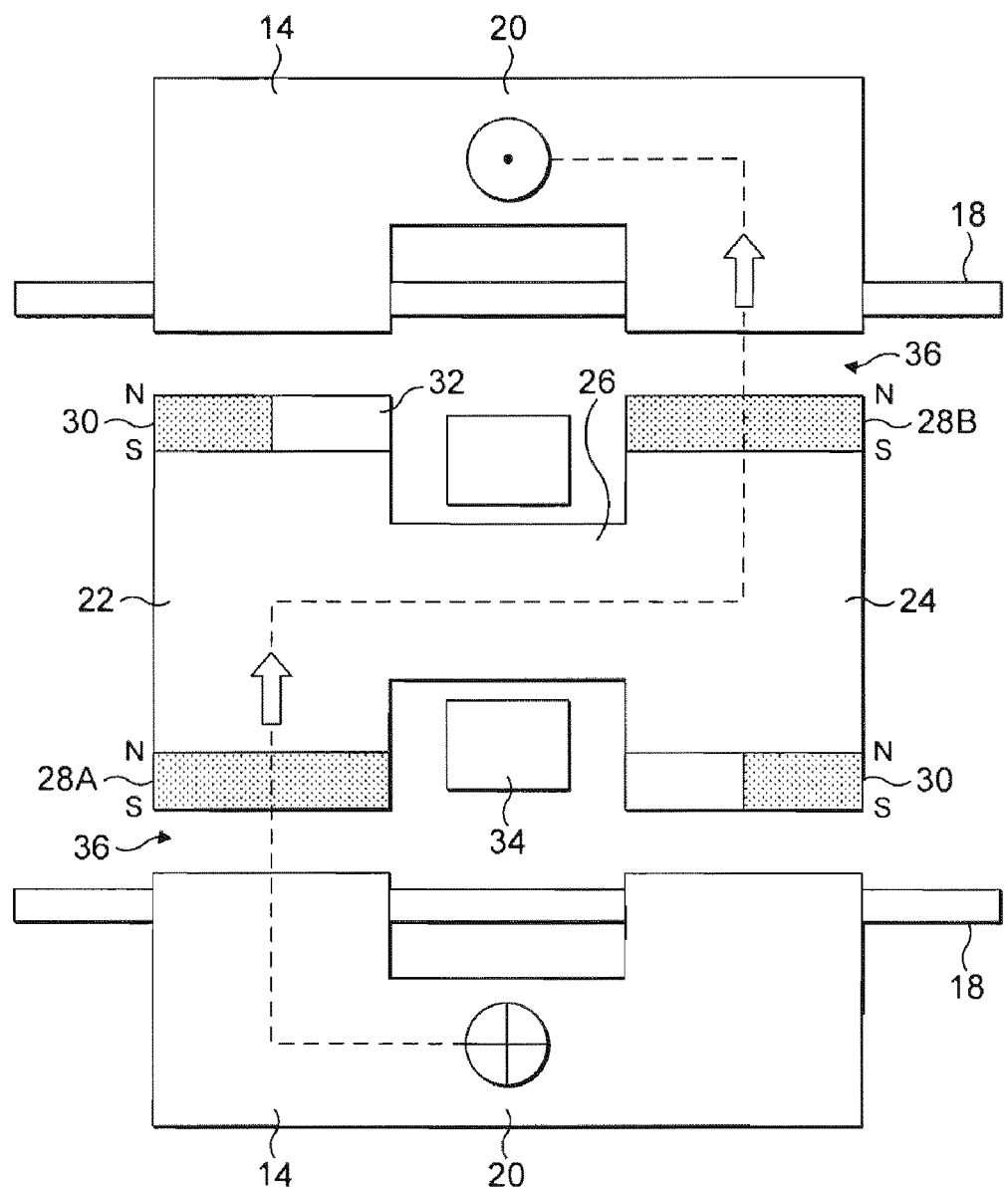
FIGS. 3, 4 and 5 show two dimensional representations of a cut axially through the machine of FIG. 1.

FIG. 3 is a developed two-dimensional representation of two planes through the machine. The first plane (the top half of FIG. 3) is a radial slice from the outside of the stator through to the centre of the shaft, that includes a permanent magnet and ferrous pole section on the left hand side and full permanent magnet pole on the right hand side. The second plane (the bottom half of FIG. 3) is a radial slice from the outside of the stator positioned one pole pitch away, resulting in a view of a full permanent magnet pole on the left hand side and a permanent magnet and ferrous pole section on the right hand side. Thus FIG. 3 can be considered as the view which would be obtained if a V-shaped segment were cut into the rotor, and the resulting exposed faces opened out into a plane.

The dashed line in FIG. 3 shows how the flux produced by the permanent magnets 28 may take a path through the centre of the rotor. As can be seen in FIG. 3, the flux passes from the permanent magnet 28A, radially into the first rotor section 22, and then along an axial path through the rotating magnetic bridge 26. The flux then passes radially outwards through second rotor section 24 and permanent magnet 28B, which is located one pole pitch away from permanent magnet 28A. The flux then crosses the air gap 36 into the stator 14. In the stator, the flux passes first radially outwards, and then axially, to reach the stator magnetic bridge 20. The stator magnetic bridge 20 carries the flux out of the plane of the paper and circumferentially through the stator magnetic bridge, as shown by the circle with a dot in FIG. 3. After having travelled circumferentially through one pole pitch, the flux reappears at the bottom of FIG. 3 as shown by the circle with a cross. From here the flux travels through the magnetic bridge 20 and stator 14 and across the air gap 36 to complete the loop at the permanent magnet 28A.

The circumferential flux path through the stator magnetic bridge 20 is encouraged by removing the slot/teeth profile from laminations in the magnetic bridge. If necessary, a non-magnetic support material may be used to support the windings in the stator magnetic bridge. Alternatively teeth of a reduced size may be used to provide limited support for the windings.

In the rotating electrical machine shown in FIG. 1, control of the rotor's magnetic field is achieved by passing a direct current through the excitation coil 34. The direct current through the excitation coil causes a magneto-motive force (mmf) to be established. The ferrous poles 32 offer a lower reluctance path to the flux than the permanent magnets, and therefore form the preferred path for the flux.

Figure 4:
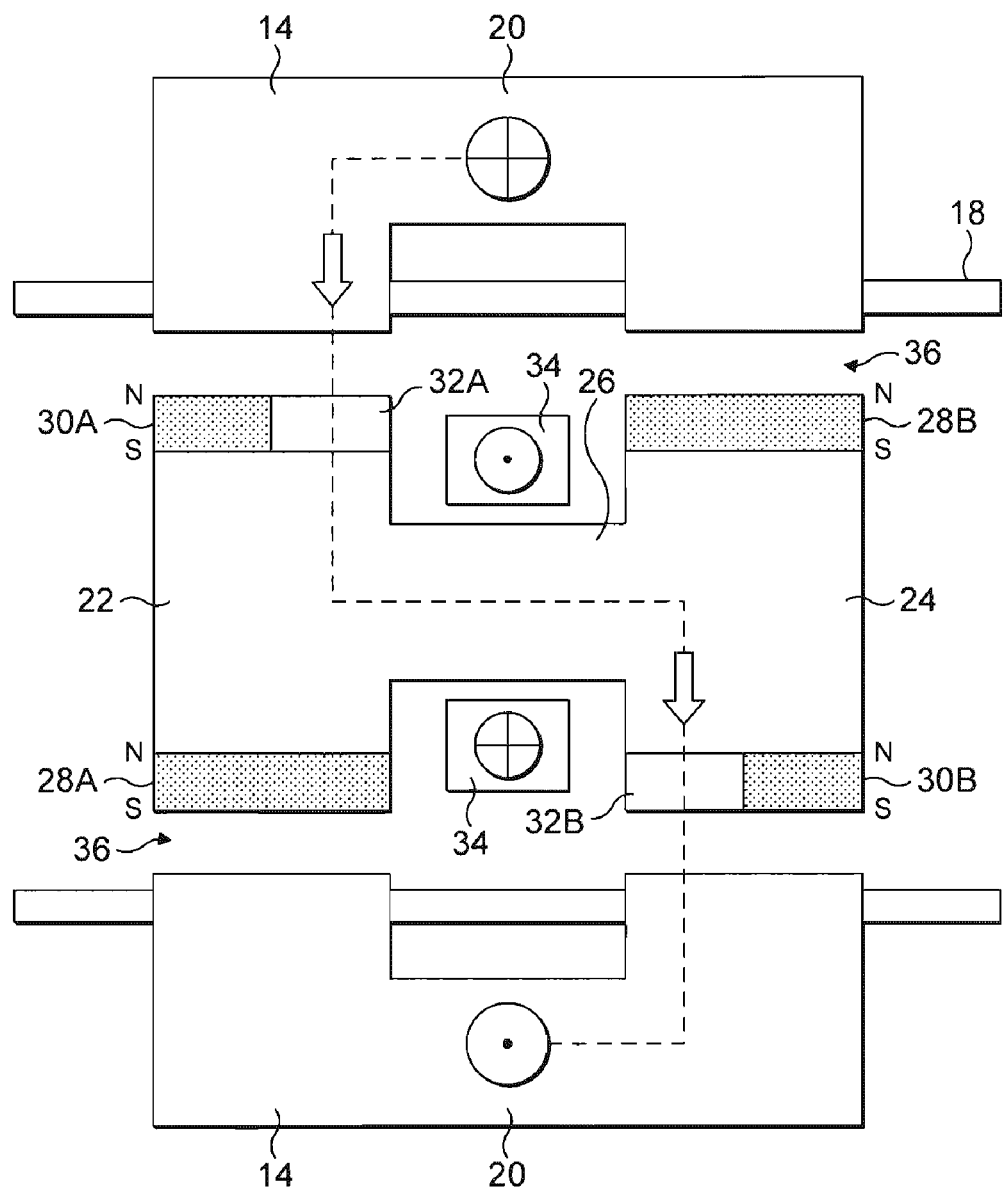

FIG. 4 is a developed two-dimensional representation of two planes through the machine, similar to FIG. 3. In FIG. 4, a negative direct current is fed through the excitation coil, with the current coming out of the plane of the paper at the top of FIG. 4, and going into the plane of the paper at the bottom of FIG. 4. The negative direct current through the excitation coil causes a flux path to be established through the machine as shown by the dashed line in FIG. 4. In this case the flux passes from the left-hand ferrous pole 32A, through the rotating magnetic bridge 26, and to the right-hand ferrous pole 32B, which is located one pole pitch away from ferrous pole 32A. The flux then passes across the air gap 36, and into the stator 14 at the bottom of FIG. 4. The stator magnetic bridge 20 carries the flux out of the plane of the paper and circumferentially through the stator magnetic bridge, as shown by the circle with a dot. After having travelled circumferentially through one pole pitch, the flux reappears at the top of FIG. 4 as shown by the circle with a cross. From here the flux travels through the magnetic bridge 20 and stator 14 and across the air gap 36 to complete the loop at the ferrous pole 32A.

The flux path established by passing a current through the excitation coil 34 causes the ferrous poles 32 to become magnetised, with the direction of magnetisation depending on the direction of the flux. In the case of the flux path shown in FIG. 4, the direction of magnetisation of the ferrous poles 32A, 32B is opposite to that of the adjacent permanent magnets 30A, 30B. In other words, the magnetic flux shown in FIG. 4 crosses the air gap 36 in the opposite direction to the flux created by the permanent magnets. Thus the flux path shown in FIG. 4 thus tends to reduce the net flux in the air gap.

Figure 5:
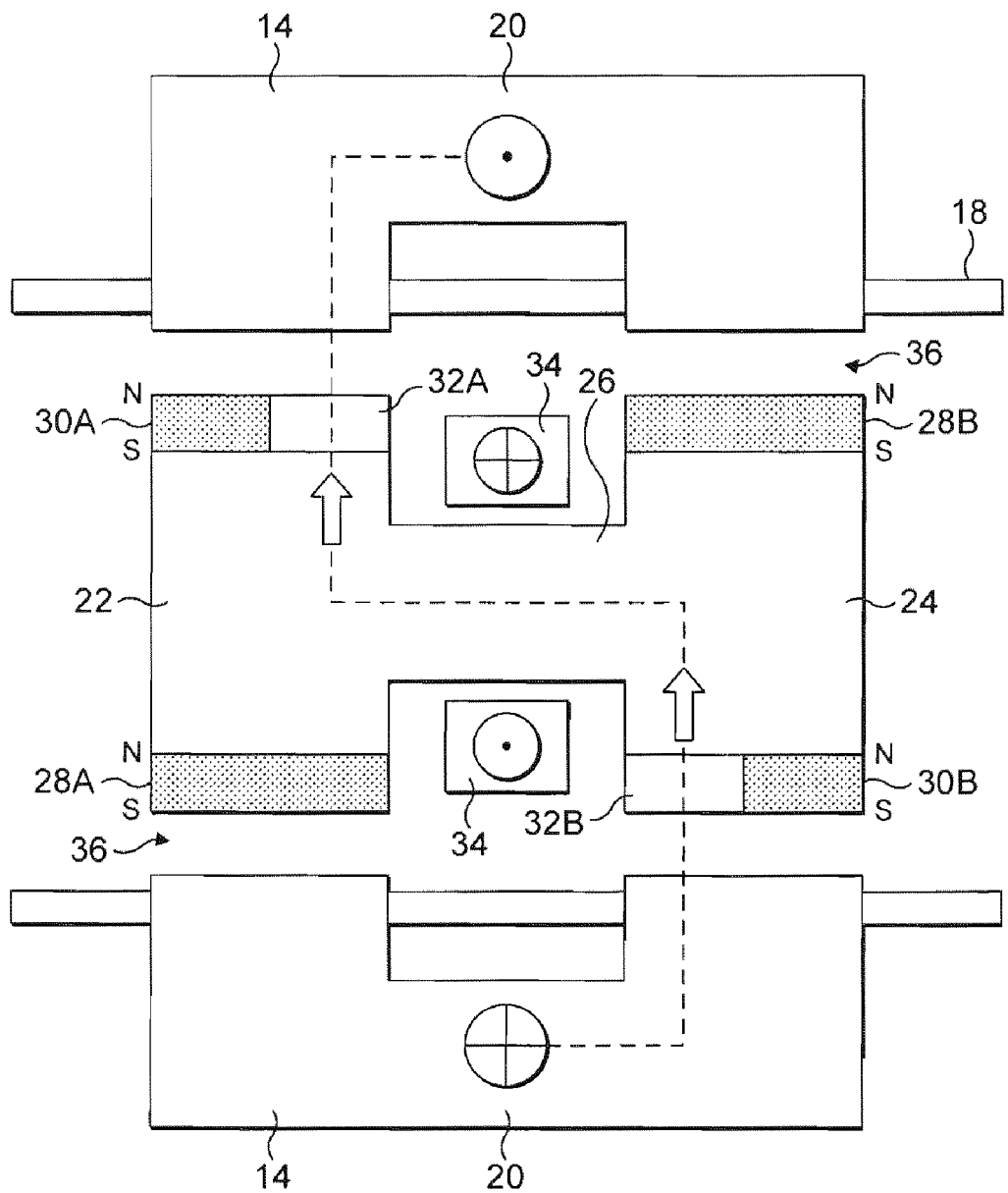

FIG. 5 shows the flux path which is established when a positive current is fed through the excitation coil 34. The flux path in FIG. 5 is in the opposite direction to that of FIG. 4, and thus tends to increase the net flux in the air gap.

Thus, by controlling the direction and magnitude of the current through the excitation coil, the amount of flux in the air gap can be controlled. Hence a brushless means of excitation control of a PM magnet machine is achieved.

Figure 6:
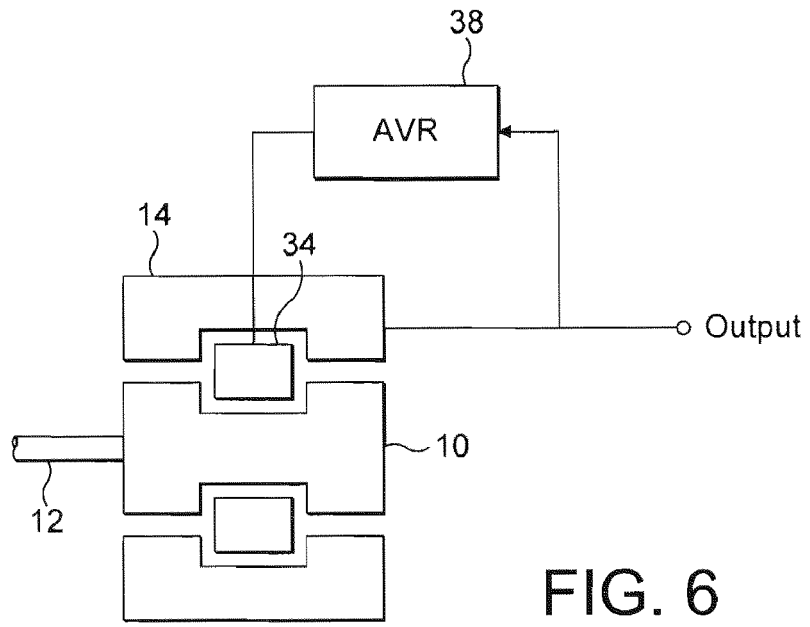
FIG. 6 shows an example of how the rotating electrical machine may be operated as a generator.

FIG. 6 shows an example of how the rotating electrical machine may be operated as a generator. In FIG. 6 the shaft 12 is connected to a prime mover (not shown), which causes the rotor assembly 10 to rotate. The rotating magnetic field of the rotor assembly causes an AC voltage to be generated in the stator windings, which AC voltage is fed to the output of the generator. The output voltage is sensed by an Automatic Voltage Regulator (AVR) 38. The AVR adjusts the amount of current through the excitation coil 34 in order to adjust the excitation of the machine. The excitation may be adjusted, for example, in order to maintain a constant output voltage.

Figure 7:
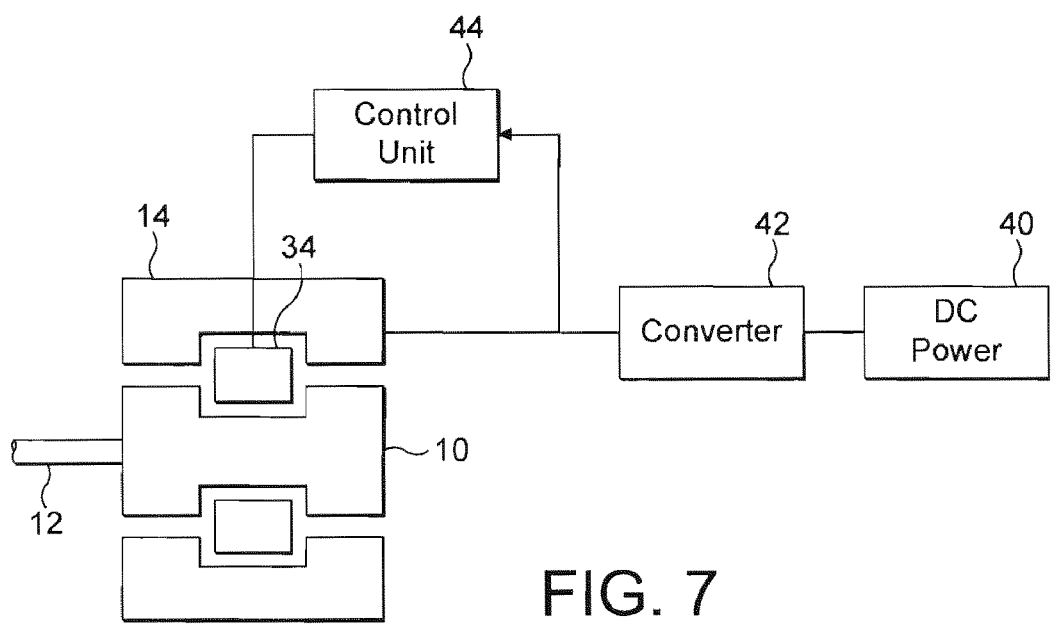
FIG. 7 shows an example of how the rotating electrical machine may be operated as a motor.

FIG. 7 shows an example of how the rotating electrical machine may be operated as a motor. In the arrangement of FIG. 7 the output of a DC power supply 40 is fed to a converter 42. The converter 42 switches the DC power supply in order to provide an electronically commutated DC current. The commutated current is fed to the stator windings. By alternating the DC current through respective stator windings, the rotor is rotated. A mechanical load (not shown) is connected to the shaft 12. A control unit 44 monitors the current in the stator windings, and adjusts the current in the excitation coil 34 to provide the appropriate amount of excitation for the operating conditions.

If required, the same machine may operate alternatively as a generator and a motor through use of the appropriate power electronics. Power electronics for operating a machine as a motor/generator are known in the art and therefore are not described further. Such an arrangement may be used, for example, in a hybrid vehicle.

Figure 8:
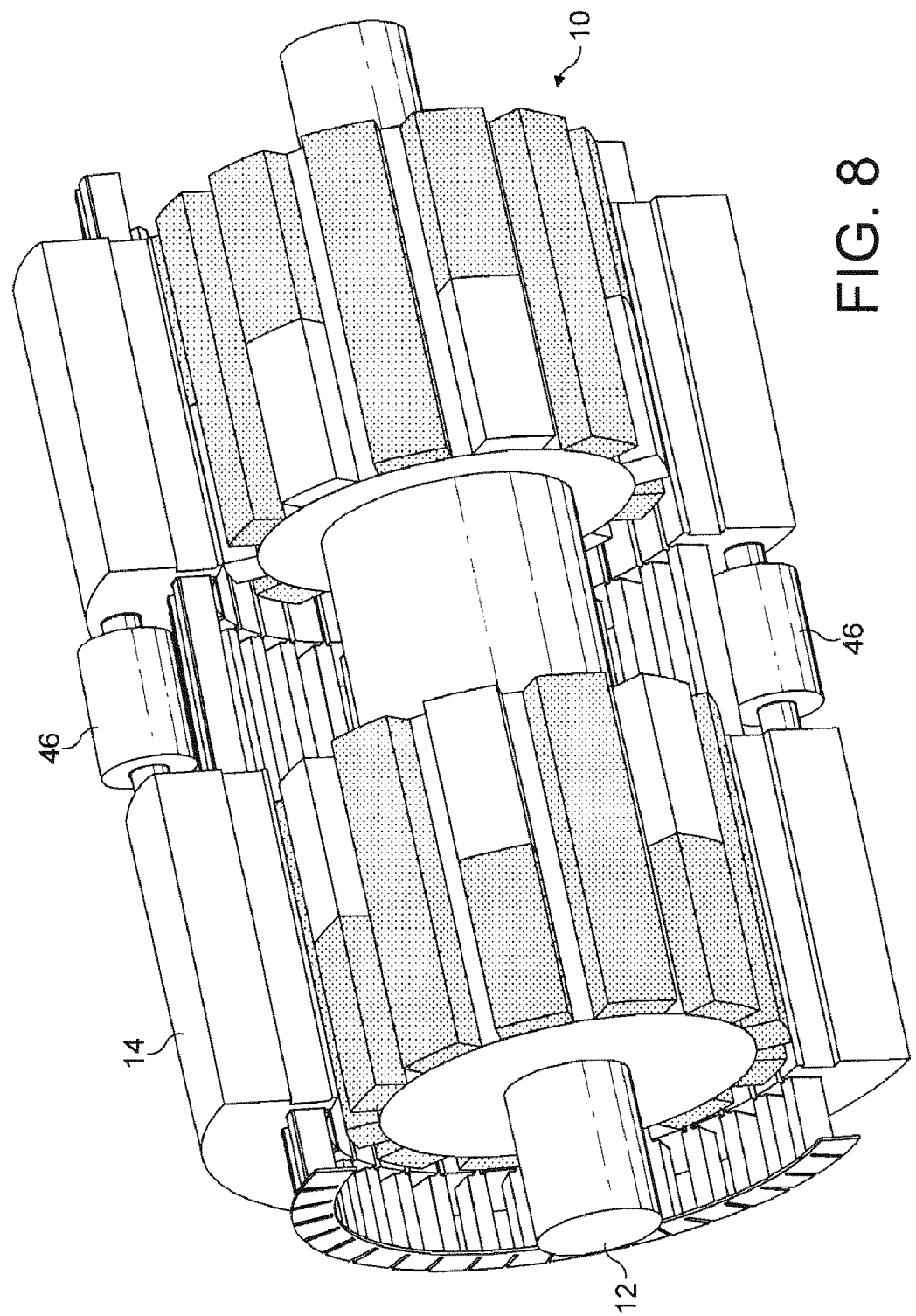
FIG. 8 shows parts of an electrical machine in a second embodiment of the invention.

FIG. 8 shows parts of an electrical machine in a second embodiment of the invention. The electrical machine of the second embodiment is similar in construction to that of the first embodiment, except that excitation is provided by wound cores 46 on the stator instead of an excitation coil around the shaft. Such an arrangement may allow easier maintenance of the machine, although the arrangement of FIG. 1 may provide more effective control of the excitation.

The radial flux machines described above have the advantage that a conventional winding process may be employed to wind the stator, which may simplify their manufacture. The machines are also scalable both axially and radially, so that machines with a wide range of ratings can be made. Furthermore, the design of the rotor assembly means that the rotating magnetic bridge can have a large cross-sectional area, which can allow a large magnetic flux to pass through the centre of the rotor. This can allow the excitation to have a large maximum value, which means that the excitation can be varied across a wide range.

Although the embodiments of the invention described above relate to a machine with two rotor sections, in alternative embodiments the machine may have a single rotor section.

Figure 9:
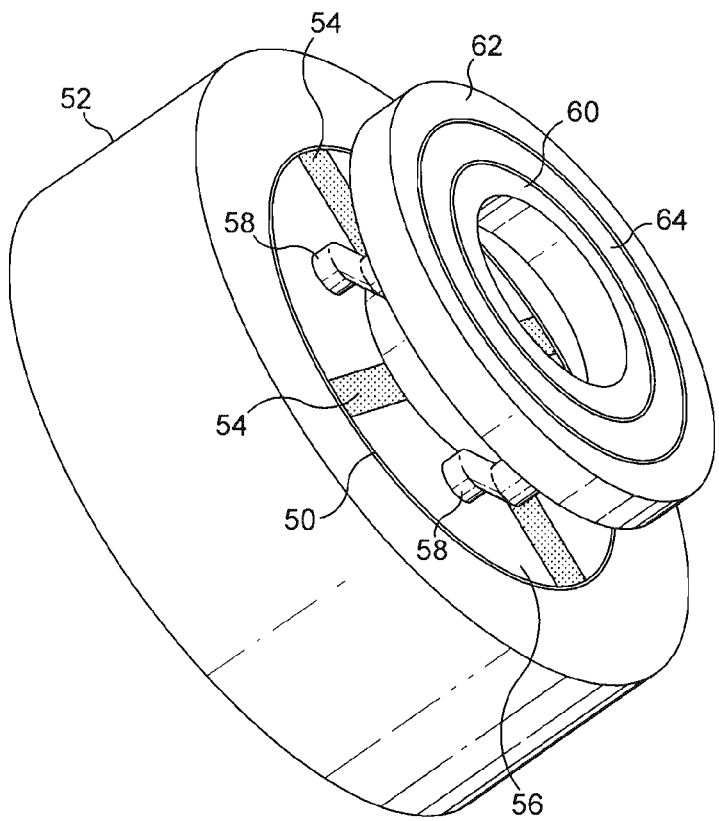
FIG. 9 shows parts of an electrical machine in a third embodiment of the invention.

FIG. 9 shows parts of an electrical machine in a third embodiment of the invention. Referring to FIG. 9, the machine comprises a rotor 50 located within a stator 52. As in the previous embodiments, the rotor is cylindrical, and rotates within a tubular chamber formed by the stator 52. The stator is laminated, and the rotor may be cast or laminated.

In the embodiment of FIG. 9, a plurality of permanent magnets 54 are embedded in recesses in the rotor 50. The permanent magnets are orientated such that their north-south axes lie in a circumferential direction within the rotor. Each alternate magnet faces in the opposite direction, such that each adjacent pair of magnets has either both south poles facing each other, or both north poles facing each other. The parts of the rotor between the permanent magnets act as ferrous poles 56, and are magnetised by the permanent magnets.

Figure 10:
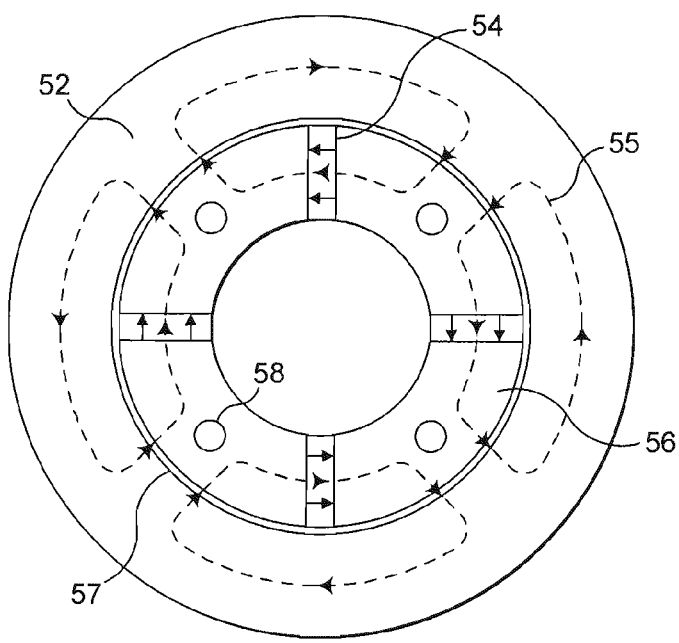
FIG. 10 shows a cross section through the electrical machine of FIG. 9.

FIG. 10 shows a cross section through the electrical machine of FIG. 9. The flux paths within the machine are indicated by the dashed lines. Referring to FIG. 10, it can be seen that the permanent magnets 54 create flux paths 55 through the ferrous poles 56, across the air gap 57, and through the stator 52. In this way a radial flux is developed across the air gap 57 between the rotor and the stator. While a four pole arrangement is shown in FIGS. 9 and 10, it will be appreciated that a different number of poles and/or magnets could be provided.

In the arrangement of FIGS. 9 and 10, in addition to the parts thus far described, a hybrid excitation system is also provided. The hybrid excitation system allows additional, controllable flux paths to be created through the machine, thereby allowing the net air gap flux to be controlled.

Referring back to FIG. 9, the hybrid excitation system of the present embodiment comprises a plurality of rods, or "flux pipes" 58 which are located in passages in the rotor between two opposing permanent magnets 54. The flux pipes which are located between two opposing north poles are attached to a first electromagnetic ring 60, while the flux pipes which are located between two opposing south poles are attached to a second electromagnetic ring 62. An electromagnetic keep 64 is located between the two electromagnetic rings 60, 62. In addition, a DC excitation coil (not visible in FIG. 9) is located next to the electromagnetic keep 64.

The flux pipes 58 are formed from a low reluctance magnetic material with good mechanical strength. A suitable material is electrical grade steel, although other materials with the appropriate properties could be used instead. The first and second electromagnetic rings 60, 62 as well as the magnetic keep 64 may be formed from the same material as the flux pipes, or from another material having similar properties.

Figure 11:
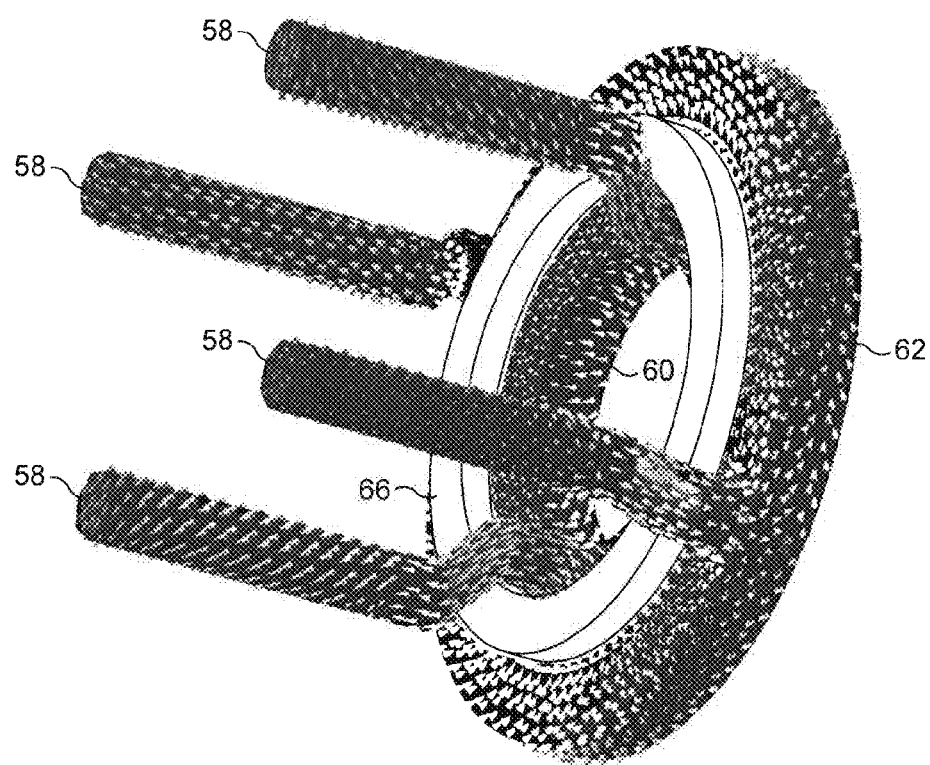
FIG. 11 shows parts of a hybrid excitation system.

FIG. 11 shows parts of the hybrid excitation system in more detail. For ease of reference the rest of the machine is not shown, although it will be appreciated that in the final machine the flux pipes are embedded in the rotor as shown in FIG. 9. Referring to FIG. 11, the hybrid excitation system comprises flux pipes 58, inner magnetic ring 60, outer magnetic ring 62, and DC excitation coil 66. The electromagnetic keep 64 (not visible in FIG. 11) is located adjacent to the DC excitation coil 66, between the inner and outer magnetic rings 60, 62. The two flux pipes from an opposing north pole pair of magnets are attached to the inner magnetic ring 60, while the two flux pipes from an opposing south pole pair of magnets are attached to the outer magnetic ring 62.

In the arrangement of FIGS. 9 through 11, the inner and outer magnetic rings 60, 62 rotate with the rest of the rotor assembly, while the DC excitation coil 66 and magnetic keep 64 are stationary. Air gaps exist between the magnetic keep 64 and the magnetic rings 60, 62 to allow rotation. These air gaps are kept as small as possible within mechanical constraints.

In operation, a controllable DC current is passed through the DC excitation coil 66. This DC current magnetises the magnetic keep 64, which in turn causes flux paths to be established through the inner and outer magnetic rings 60, 62 and flux pipes 58.

When there is no current in the DC excitation coil 66, the main flux paths through the machine link directly with the stator, as shown in FIG. 10. Nonetheless, some flux will return through the flux pipes 58, magnetic rings 60, 62 and magnetic keep 64, as these present a low reluctance path to the magnetic poles. By passing a DC current through the DC excitation coil 66, it is possible either to enhance or to reduce the amount of flux in the air gap 57, depending on the direction of the current.

Figure 12:
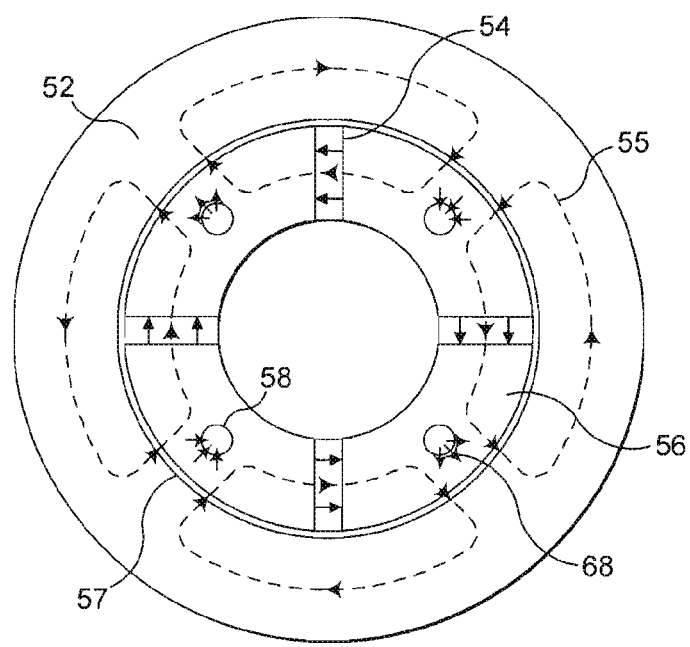
FIG. 12 shows some of the flux paths through the machine of FIG. 9.

FIG. 12 shows some of the flux paths through the machine when a current is passed through the DC excitation coil. Referring to FIG. 12, the main flux paths are the paths 55 through the ferrous poles 56, across the air gap 57, and through the stator 52, as in FIG. 10. However, in FIG. 12, the amount of flux crossing the air gap 57 is varied by providing additional flux paths 68 through the flux pipes 58. In FIG. 12 the flux paths are shown as enhancing the air gap flux. The flux paths may either enhance or reduce the air gap flux, depending on the direction of the DC current in the excitation coil.

Figure 13A:
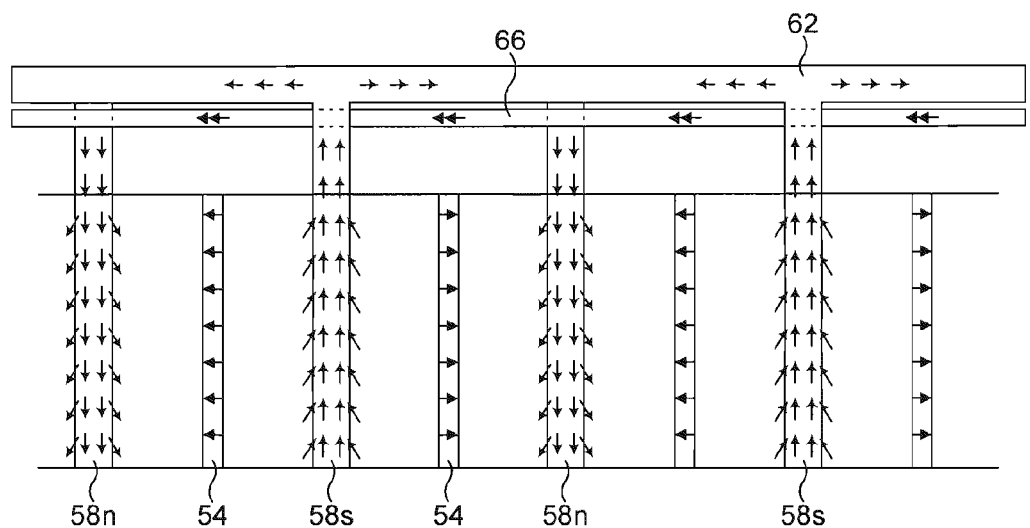
FIGS. 13A and 13B show linear two dimensional representations of the flux paths through the hybrid excitation system.
Figure 13B:
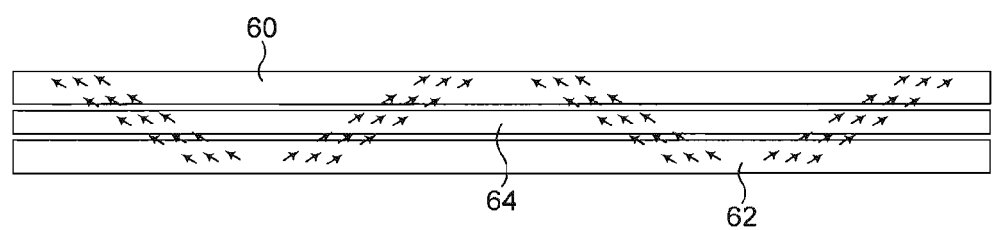

FIGS. 13A and 13B show linear two dimensional representations of the flux paths through the hybrid excitation system. FIG. 13A shows the view which would be obtained if a cylindrical slice through the rotor were opened out into a plane, while FIG. 13B shows a corresponding opened out end view of the rotor.

In FIG. 13A, a DC current is passed from right to left in the DC excitation coil 66. The magnetic field produced by the DC current causes a magnetic flux to be developed across the magnetic keep 64. The inner and outer electromagnetic rings 60, 62 and the flux pipes 58 provide a low reluctance path for the flux. Thus, referring to FIGS. 13A and 13B, a flux path is established from the magnetic keep 64, through the inner electromagnetic ring 60, into the flux pipes 58n located between a north pole pair, through the machine, out of the flux pipes 58s between a south pole pair, and through the outer electromagnetic ring 62 back to the magnetic keep 64. The magnetic flux from the flux pipes either enhances or reduces the magnetic flux in the air gap between the rotor and the stator, as shown in FIG. 12, in dependence on the magnitude and direction of the current through the DC excitation coil 66.

The hybrid excitation system described above can thus provide a brushless means of manipulating the magnetic field within the permanent magnet machine. If the machine is operating as a generator, the amount of current passing through the DC excitation coil may be adjusted by an automatic voltage regulator, in a similar way to that shown in FIG. 6. If the machine is operating as a motor, the amount of current in the DC excitation coil may be adjusted by a control unit in a similar way to that shown in FIG. 7. If the machine is operating as a motor/generator, then the appropriate electronics may be provided for controlling the excitation according to the operating conditions.

In the hybrid excitation system described above a flux pipe is inserted between each pair of magnets. However fewer or additional flux pipes could be provided if desired. In general, a flux pipe should be provided between at least one opposing north pole pair of magnets and at least one opposing south pole pair of magnets. Although cylindrical flux pipes are shown, the flux pipes could have any appropriate cross section, and this may be constant through the rotor or may vary.

In the arrangements described above, features of one embodiment may be provided with any of the other embodiments, as appropriate. For example, in the first and second embodiments, the permanent magnets and/or ferrous poles may be at least partially embedded in the rotor. Other variations of detail will be apparent to the skilled person.

The various embodiments described above allow the amount of flux in the air gap of a radial flux permanent magnetic machine to be adjusted, by varying the current through a DC excitation coil. In the embodiments which have been described, it is not necessary for the DC excitation coil to rotate with the rotor, and thus brushless excitation techniques are achieved. The excitation techniques described can allow, for example, the voltage drop off which would otherwise occur with increasing load in a permanent magnet generator to be compensated for through appropriate control of the excitation. This may increase the number of applications in which the radial flux permanent magnet machines can be used. Furthermore, the radial flux machines described above are relatively simple to manufacture, and are readily scalable, which can allow machines with a wide range of sizes and/or ratings to be produced.

The invention claimed is:

1. A rotating electrical machine comprising:
    a stator;
    a rotor arranged to rotate inside the stator, the rotor comprising a plurality of permanent magnets arranged to produce a radial magnetic flux in an airgap between the rotor and the stator; and
    a stationary excitation coil;
    wherein the rotor comprises a plurality of low reluctance elements;
    wherein a current through the stationary excitation coil causes a magnetic flux to be established in a magnetic flux path which passes into the rotor through a first low reluctance element and out of the rotor through a second low reluctance element, which magnetic flux combines with the radial magnetic flux produced by the permanent magnets in the airgap; and
    wherein the low reluctance elements are rods embedded in the rotor.

2. A rotating electrical machine according to claim 1, wherein the low reluctance elements provide a path of least reluctance through the rotor.

3. A rotating electrical machine according to claim 1, wherein the low reluctance elements are substantially non-magnetised when no current is passing through the excitation coil.

4. A rotating electrical machine according to claim 1, wherein the magnetic flux path passes through the rotor core.

5. A rotating electrical machine according to claim 1, wherein the magnetic flux path is at least partially co-located in a radial direction with the magnetic flux produced by the permanent magnets.

6. A rotating electrical machine according to claim 1, wherein the stator comprises stator windings through which the magnetic flux produced by the permanent magnets passes, and the magnetic flux produced by the stationary excitation coil passes through the same stator windings.

7. A rotating electrical machine according to claim 1, wherein the machine is arranged such that the amount of radial magnetic flux in the airgap between the rotor and the stator is variable in dependence on the current through the stationary excitation coil.

8. A rotating electrical machine according to claim 1, wherein each rod is connected to a rotating magnetic ring.

9. A rotating electrical machine according to claim 8, wherein the stationary excitation coil is arranged to generate a magnetic flux through the rotating magnetic ring.

10. A rotating electrical machine according to claim 9, further comprising a stationary magnetic keep adjacent to the rotating magnetic ring which is arranged to be magnetised by the stationary excitation coil, thereby to generate the magnetic flux through the rotating magnetic ring.

11. A rotating electrical machine according to claim 1, wherein at least one rod provides a flux path into the rotor and at least one rod provides a flux path out of the rotor when a current is passed through the stationary excitation coil.

12. A rotating electrical machine according to claim 1, wherein at least one rod is connected to a first rotating magnetic ring and at least one other rod is connected to a second rotating magnetic ring.

13. A rotating electrical machine according to claim 1, wherein the permanent magnets are embedded in the rotor.

14. A rotating electrical machine according to claim 13, wherein parts of the rotor between the permanent magnets form ferrous poles.

15. A rotating electrical machine according to claim 1, wherein the permanent magnets are disposed circumferentially about the rotor.

16. A rotating electrical machine according to claim 1, wherein the stator comprises stator windings arranged circumferentially around the rotor.

17. A rotating electrical machine according to claim 1, further comprising a control unit which controls the amount of current through the excitation coil.

18. A rotating electrical machine according to claim 1, wherein the excitation coil comprises at least one winding arranged circumferentially around the rotor.

19. A rotating electrical machine according to claim 1, wherein the excitation coil comprises a plurality of wound cores arranged around the rotor.

20. A rotating electrical machine according to claim 1, wherein the excitation coil is located to one side of the rotor in an axial direction.

21. A rotating electrical machine according to claim 1, the stator comprising a generally tubular chamber within which the rotor is arranged to rotate.

22. A rotating electrical machine comprising:
a stator;
a rotor arranged to rotate inside the stator, the rotor comprising a plurality of permanent magnets arranged to produce a radial magnetic flux in an airgap between the rotor and the stator; and
a stationary excitation coil;
wherein the rotor comprises a plurality of low reluctance elements;
wherein a current through the stationary excitation coil causes a magnetic flux to be established in a magnetic flux path which passes into the rotor through a first low reluctance element and out of the rotor through a second low reluctance element, which magnetic flux combines with the radial magnetic flux produced by the permanent magnets in the airgap;
wherein the low reluctance elements are ferrous poles; and
wherein some of the permanent magnets are smaller than the other permanent magnets, and the ferrous poles are located adjacent to the smaller permanent magnets.

23. A rotating electrical machine according to claim 22, wherein the ferrous poles form a path of least reluctance through the rotor.

24. A rotating electrical machine according to claim 22, wherein the ferrous poles comprise a high permeability material.

25. A rotating electrical machine according to claim 22, wherein the ferrous poles are substantially non-magnetised, or have a low magnetisation, when no current is passing through the excitation coil.

26. A rotating electrical machine according to claim 22, wherein the permanent magnets are arranged in a circular array of substantially constant pitch around the circumference of the rotor.

27. A rotating electrical machine according to claim 22, wherein the rotor comprises a first rotor section having a plurality of permanent magnets and a plurality of ferrous poles, and a second rotor section spaced axially along the rotor from the first rotor section, the second rotor section having a plurality of permanent magnets and a plurality of ferrous poles.

28. A rotating electrical machine according to claim 27, wherein the magnetic flux path passes through a ferrous pole in both rotor sections.

29. A rotating electrical machine according to claim 27, wherein the ferrous poles are juxtaposed by one pole pitch between the first and second rotor sections.

30. A rotating electrical machine according to claim 27, wherein the magnetic flux produced by the excitation coil passes through ferrous poles on the first and second rotor sections.

31. A rotating electrical machine according to claim 27, wherein the rotor further comprises a rotating magnetic bridge linking the first rotor section and the second rotor section.

32. A rotating electrical machine according to claim 31, wherein the magnetic flux produced by the excitation coil passes at least partially in an axial direction through the rotating magnetic bridge.

33. A rotating electrical machine comprising:
a stator;
a rotor arranged to rotate inside the stator, the rotor comprising a plurality of permanent magnets arranged to produce a radial magnetic flux in an airgap between the rotor and the stator; and
a stationary excitation coil;
wherein the rotor comprises a first rotor section having a plurality of permanent magnets and a plurality of ferrous poles, and a second rotor section spaced axially along the rotor from the first rotor section, the second rotor section having a plurality of permanent magnets and a plurality of ferrous poles;
wherein a current through the stationary excitation coil causes a magnetic flux to be established in a magnetic flux path which passes through a ferrous pole in both rotor sections; and
wherein the ferrous poles are arranged on the central sides of the rotor sections, in an axial direction.

34. A rotating electrical machine according to claim 33, wherein the stationary excitation coil is located adjacent to the ferrous poles.

35. A rotating electrical machine according to claim 33, wherein the stationary excitation coil is located at least partially in a recess in the rotor.

36. A rotating electrical machine according to claim 35, wherein the recess in the rotor is formed by a rotating magnetic bridge with a smaller cross-sectional area than first and second rotor sections.

37. A rotating electrical machine according to claim 33, wherein the stationary excitation coil is located at least partially within a recess in the stator.

38. A rotating electrical machine according to claim 33, wherein the stator comprises a first stator section, a second stator section, and a stator magnetic bridge between the first stator section and the second stator section.

39. A rotating electrical machine according to claim 38, wherein the magnetic flux produced by the excitation coil passes circumferentially through the stator magnetic bridge.

40. A rotating electrical machine according to claim 38, wherein the first and second stator sections comprise teeth which form slots for stator windings, and the stator magnetic bridge has no teeth or teeth of a reduced size.

41. A rotating electrical machine according to claim 38, wherein the stator magnetic bridge is recessed with respect to the first and second stator sections, and the excitation coil is at least partially located in the recess.

\* \* \* \* \*